United States Patent
Klepfer

[11] 3,925,151
[45] Dec. 9, 1975

[54] NUCLEAR FUEL ELEMENT
[75] Inventor: Harold H. Klepfer, San Jose, Calif.
[73] Assignee: General Electric Company, San Jose, Calif.
[22] Filed: Feb. 11, 1974
[21] Appl. No.: 441,133

[52] U.S. Cl. .................................. 176/68; 176/82
[51] Int. Cl.² .......................................... G21C 3/20
[58] Field of Search ..................... 176/68, 82, 91 R

[56] References Cited
UNITED STATES PATENTS
3,119,747  1/1964  Wallace et al. ...................... 176/82
3,262,860  7/1966  Zebroski ........................... 176/91 R Primary Examiner—Stephen C. Bentley
Attorney, Agent, or Firm—Ivor J. James, Jr.; Samuel E. Turner; Sam E. Laub

[57] ABSTRACT

A nuclear fuel element for use in the core of a nuclear reactor is disclosed and has a metal liner disposed between the cladding and the nuclear fuel material and a high lubricity material in the form of a coating disposed between the liner and the cladding. The liner preferably has a thickness greater than the longest fission product recoil distance and is composed of a low neutron capture cross-section material. The liner is preferably composed of zirconium, an alloy of zirconium, niobium or an alloy of niobium. The liner serves as a preferential reaction site for volatile impurities and fission products and protects the cladding from contact and reaction with such impurities and fission products. The high lubricity material acts as an interface between the liner and the cladding and reduces localized stresses on the cladding due to fuel expansion and cracking of the fuel.

32 Claims, 3 Drawing Figures

NUCLEAR FUEL ELEMENT

BACKGROUND OF THE INVENTION

This invention relates broadly to an improvement in nuclear fuel elements for use in the core of nuclear fission reactors, and more particularly to an improved nuclear fuel element having therein a liner disposed between the cladding and the nuclear fuel material and a high lubricity material in the form of a coating disposed between the liner and the cladding.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and the coolant or the moderator if a moderator is present, or both if both the coolant and the moderator are present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys, niobium (columbium), certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 600° F are strong, ductile, extremely stable and non-reactive in the presence of demineralized water or steam which are commonly used as reactor coolants and moderators. Within the confines of a sealed fuel element, however, the hydrogen gas generated by the slow reaction between the cladding and residual water inside the cladding may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures. Also, fuel element performance has revealed a problem with splitting of the cladding due to interactions between the nuclear fuel, the cladding and the fission products produced during nuclear fission reactions.

The zirconium cladding of a nuclear fuel element is exposed to one or more of the gases listed above and fission products during irradiation in a nuclear reactor and this occurs in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases upon heating, such as during fuel element manufacture and especially during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. Release of these residual gases within the sealed metal-clad fuel element also increases the internal pressure within the element and thus introduces additional stresses in the presence of corrosive conditions. Only recently has it been discovered that these undesirable results are exaggerated by the localized mechanical stresses due to fuel-cladding differential expansion (localized stress at $UO_2$ cracks). Corrosive gases are released from the cracks in the fuel at the very point of localized stress at the intersection of the fuel cracks with the cladding surface. The localized stress is exaggerated by high friction between the fuel and cladding.

Thus in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uranium canned in a metal case in which the protective jackets or coverings for the slugs are a zinc-aluminum bonding layer. U.S. Pat. No. 2,849,387 discloses a jacketed fissionable body comprising a plurality of openended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Pat. Publication No. 47-46559 dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Pat. Publication No. 47-14200 in which the coating of one of two groups of pellets is with a layer of silicon carbide and the other group is coated with a layer of pyrocarbon or metal carbide.

The coating of nuclear fuel material introduces reliability problems in that failure to achieve uniform coatings free of faults is difficult. Further, the deterioration of the coating can introduce problems with the long-lived performance of the nuclear fuel material.

Another approach has been to introduce a barrier between the nuclear fuel material and the cladding holding the nuclear fuel material as disclosed in U.S. Pat. No. 3,230,150 (copper foil), German Pat. Publication DAS No. 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, several of the foregoing references involve incompatible materials with either the nuclear fuel (e.g., carbon can combine with oxygen from the nuclear fuel), or the cladding (e.g., copper and other metals or carbon can diffuse into the cladding, altering the properties of the cladding), or the nuclear fission reaction (e.g., by acting as neutron absorbers). None of the listed references disclose solutions to the recently discovered problem of localized stress due to high friction between the nuclear fuel and the cladding.

Accordingly, it has remained desirable to develop nuclear fuel elements minimizing the problems discussed above.

SUMMARY OF THE INVENTION

A particularly effective nuclear fuel element for use in the core of a nuclear reactor has (1) a metal liner disposed between the cladding and the nuclear fuel material and (2) a high lubricity material in the form of a coating disposed between the liner and the cladding. The liner is comprised of a low neutron capture cross-section material and is preferably comprised of zirconium, a zirconium alloy, niobium or a niobium alloy. The liner serves as a preferential reaction site for reaction with volatile impurities or fission products present inside the nuclear fuel element and in this manner serves to protect the cladding from exposure to and attack by the volatile impurities or fission products. During nuclear fission reactions in a nuclear reactor, the liner has a higher ambient temperature than does the cladding. The cladding is completely unchanged in design and function from previous practice for the nuclear reactor design. The high lubricity material acts as an interface between the liner and the cladding reducing friction and localized high stresses on the cladding. Preferred lubricity materials include graphite, molybdenum disulfide, and other inorganic compounds having a layered crystalline structure. This invention has the striking advantage that no high lubricity material (particularly, no carbonaceous material) is in contact with the nuclear fuel during nuclear fission chain reactions.

OBJECTS OF THE INVENTION

It is an object of this invention to provide a nuclear fuel element capable of operating in nuclear reactors for extended periods of time without the occurrence of splitting of the cladding, corrosion of the cladding, or other fuel failure problems.

It is another object of this invention to provide a nuclear fuel element having a low neutron capture cross section metal liner disposed between the cladding and the nuclear fuel material serving as a reaction site for reaction with volatile impurities or fission products inside the nuclear fuel element.

Still another object of this invention is to provide a nuclear fuel element having a high lubricity material disposed between the metal liner and the cladding serving as an interface between the liner and the cladding to reduce localized stresses on the cladding.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
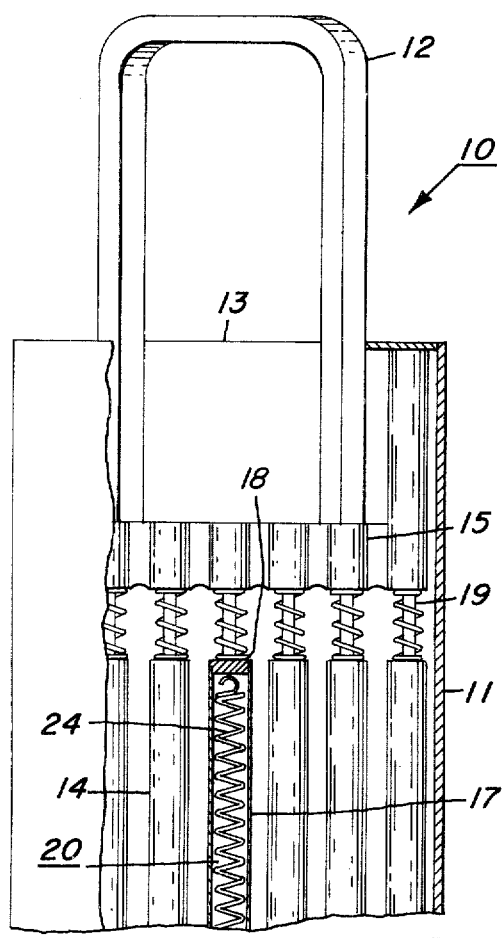
FIG. 1 presents a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly consists of a tubular flow channel 11 of generally square cross section provided at its upper end with lifting bale 12 and at its lower end with a nose piece (not shown due to the lower end portion of assembly 10 being omitted). The upper end of channel 11 is open at 13 and the lower end of the nose piece is provided with coolant flow openings. An array of fuel elements or rods 14 is enclosed in channel 11 and supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption and resistance to bowing and vibration which is occasionally caused by flow of the coolant at high velocity.

Figure 2:
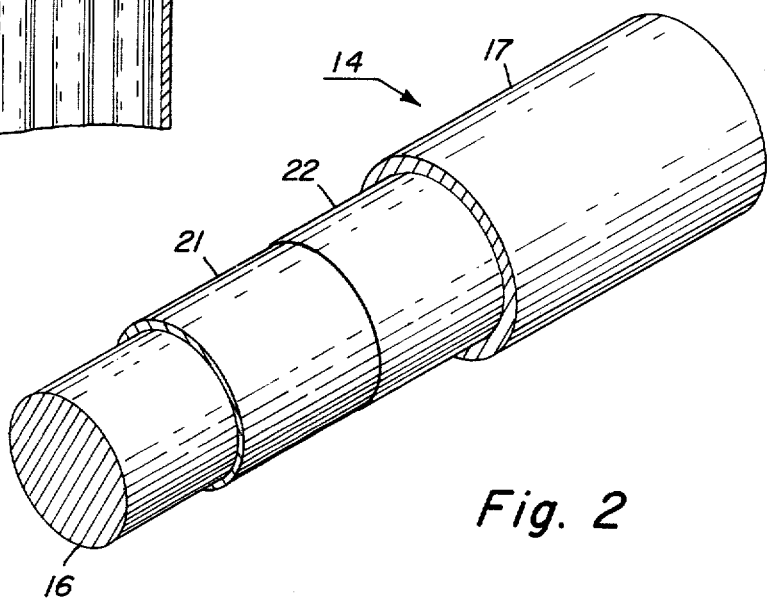
FIG. 2 presents a view in partial progressive section of a nuclear fuel element according to the teaching of this invention.

A nuclear fuel element or rod 14 is shown in FIG. 2 in a partial progressive sectional view constructed in accordance with the teachings of this invention. The fuel element includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 3:
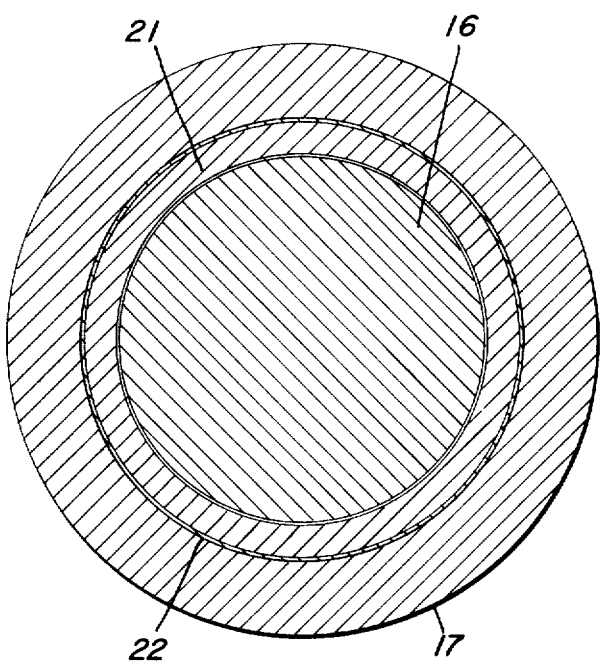
FIG. 3 presents an enlarged sectional view of the nuclear fuel element in FIG. 2 further illustrating the teaching of this invention.

Referring now to FIGS. 2 and 3, the nuclear fuel material 16 forming the central core of the fuel element 14 is surrounded by a highly reactive, low neutron absorption cross section liner 21. The liner serves as a preferential sink or reaction site for reaction with volatile impurities or fission products inside the nuclear fuel element and in this manner serves to protect the cladding 17 from exposure to and attack by the volatile impurities or fission products inside the nuclear fuel element. During nuclear fission reactions in a nuclear reactor, the liner has a higher ambient temperature than does the cladding, and the liner is preferably comprised of zirconium or an alloy of zirconium. Other materials suitable for use as a liner include niobium and alloys of niobium. The thickness of the liner is selected to be greater than the longest fission product recoil distance but less than the current gap in existing nuclear fuel elements between the cladding and the nuclear fuel material. The operating temperature of the nuclear fuel element is above the temperature at which any significant neutron radiation damage to the liner occurs, and in the liner is ductile, has a high work-hardening coefficient and a high resistance to crack initiation and propagation.

The liner 21 is surrounded by a layer or coating 22 of a high lubricity material and the layer or coating 22 is surrounded by cladding 17. The high lubricity material enables easy assembly of the fuel element in that it acts as a lubricant to enable fitting of the liner into the cladding. The layer 22 of high lubricity material can be in the form of a coating on the outer surface of the liner 21 (i.e., the surface of the liner 21 facing the cladding 17), or a coating on the inner surface of the cladding 23, or a hollow cylinder disposed between the liner and the cladding. In addition, the layer 22 can be in the form of a hollow cylindrical foil or a foil wrapped to form a hollow cylinder and is capable of being inserted inside the cladding. The high lubricity material can be selected from the group consisting of graphite and inorganic compounds having a layered crystal structure such as molybdenum disulfide or other materials having special properties which reduce fuel cladding friction. The preferred lubricity material used in this invention is graphite.

The cladding 17 is a metal container serving to prevent contact and chemical reactions between the nuclear fuel and the reactor coolant and/or moderator and to prevent the radioactive fission products occurring in the nuclear fuel during nuclear fission reactions from getting into the reactor coolant and/or moderator. Preferred cladding materials are zirconium and zirconium alloys.

The following dimensions are given by way of example of preferred dimensions and do not serve to limit the teaching of the invention. A nuclear fuel element has an elongated cladding or container in the range of about 15 inches to about 170 inches in length and about 0.303 inch to about 0.503 inch in internal diameter and a thickness of about 0.010 inch to about 0.070 inch. A body of nuclear fuel material is disposed in and partly fills the container to form an internal cavity with one embodiment having the nuclear fuel in the form of pellets having a diameter in the range of about 0.30 inch to about 0.50 inch and a pellet length of about 0.20 inch to about 0.90 inch. The nuclear fuel body leaves a cavity at one end of the container and a nuclear fuel material retaining means is positioned in the cavity. A hollow, cylindrical, low-neutron capture cross section metal liner having an internal diameter in the range of about 0.301 inch to about 0.501 inch and a thickness in the range of about 0.0005 inch to about 0.0015 inch is positioned between the fuel body and the cladding. A layer of high lubricity material is disposed between the cladding and the liner and the layer has a thickness in the range of about 0.00005 inch to about 0.0005 inch.

The invention includes a method of producing a nuclear fuel element comprising disposing a layer of high lubricity material adjacent to the surface of a clad container open at one end, inserting a low neutron capture cross section metal liner in the form of a hollow cylinder of either solid or lapped foil inside the layer of high lubricity material, filling the clad container with nuclear fuel material leaving a cavity at the open end, inserting a nuclear fuel material retaining means into the cavity, applying an enclosure to the open end of the container leaving the cavity in communication with the nuclear fuel, and then bonding the end of the clad container to said enclosure to form a tight seal therebetween.

The high lubricity material may also be disposed as a layer on the outside surface of the liner rather than on the cladding inside.

The present invention offers several advantages promoting a long operating life for the nuclear fuel element including the reduction of cladding hydriding, the minimization of localized stress, the minimization of stress and strain corrosion, and the reduction of the probability of a splitting failure in the cladding. The invention further prevents expansion (or swelling) of the nuclear fuel into direct contact with the cladding, and this prevents localized stress on the cladding, initiation or acceleration of stress corrosion of the cladding and bonding of the nuclear fuel to the cladding.

Another striking advantage of this invention is the absence of direct contact between the high lubricity material and the nuclear fuel material thus avoiding the possibility of a reaction producing gases such as carbon monoxide and carbon dioxide when the high lubricity material is graphite and introducing excess swelling or internal gas pressure in the fuel element.

The properties of the liner can be independently selected, and this leaves the design of the properties of the cladding to be independent of any functions other than containment and thermal conductivity functions.

In particular the composition and texture of the liner can be selected to maximize the effectiveness of the liner in protecting the cladding from fission products and gaseous impurities in the nuclear fuel element. Also the liner composition, texture, and temperature can be easily selected (independently of the cladding) to assure that the liner is ductile. The liner can also be selected to have a high work hardening coefficient and a high resistance to crack initiation and propagation than possible for the cladding.

Those skilled in the art will gain a further understanding of this invention from the following illustrative, but not limiting, examples of this invention.

EXAMPLE 1

Several nuclear fuel elements containing metal liners with an inorganic lubricant are constructed for operation in a test reactor. In one experiment, the metal liner and the high lubricity material comprise a cylindrical zirconium foil coated on the outside surface with graphite. The liner is 0.001 inch thick foil with the thickness of the graphite coating being in the range of 0.0001 to 0.0005 inch. The coated liner is placed in a Zircaloy-2 clad open at one end and the graphite coating separates the liner from the clad followed by loading of pellets of the nuclear fuel and a helical member into the clad and welding in place an end plug on the open end of the clad. The clad is 0.563 inch in outside diameter with a wall thickness of 0.037 inch and there is a net fuel-clad gap of 0.011 inch. Instrumentation was attached to the assembled nuclear fuel element to measure changes in length in the clad during reactor operation. The testing of the fuel elements is very favorable, and comparison of the axial length changes experienced by the fuel element having the coated liner with a fuel element not having a liner shows that the fuel element with a coated metal liner is effective in reducing fuel-clad interaction.

EXAMPLE 2

The procedure of Example 1 is repeated to assemble several nuclear fuel elements except that the graphite is applied to the inside surface of the Zircaloy-2 cladding and an uncoated niobium foil was inserted into the clad. The clad has an outside diameter of 0.493 inch and a thickness of 0.034 inch and the thickness of the graphite coating is in the range of 0.0001 inch to 0.0005 inch. The thickness of the niobium foil is 0.0005 inch. As in Example 1, the assembled nuclear fuel elements have attached instrumentation to measure changes in length in the clad during reactor operation. The testing of the fuel elements is very favorable, and comparison of the axial length changes experienced by the fuel element having the coated clad and liner with a fuel element not having the liner or the coated clad shows that the fuel element with the metallic liner and coated clad reduces fuel-clad interaction.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element which comprises a metallic elongated container in the form of a right circular cylinder, a layer of high lubricity material being disposed in and adjacent to the inside surface of said container, a low neutron capture cross section metal liner being disposed in said container and adjacent to said layer, a body of nuclear fuel material disposed in said container and surrounded by said liner, and end plugs sealing each end of said container.

2. A nuclear fuel element of claim 1 in which the layer of high lubricity material is a coating on the inside surface of said container.

3. A nuclear fuel element of claim 1 in which the layer of high lubricity material is a coating on the outside surface of the metal liner.

4. A nuclear fuel element of claim 1 in which the layer of high lubricity material is a hollow cylinder disposed between the liner and the cladding.

5. A nuclear fuel element of claim 1 in which the layer of high lubricity material is selected from the group consisting of graphite and molybdenum disulfide.

6. A nuclear fuel element of claim 5 in which the layer of high lubricity material is graphite.

7. A nuclear fuel element of claim 5 in which the layer of high lubricity material is molybdenum disulfide.

8. A nuclear fuel element of claim 1 in which the nuclear fuel material is selected from the group consisting of uranium compounds, plutonium compounds and mixtures thereof.

9. A nuclear fuel element of claim 1 in which the nuclear fuel material is comprised of uranium dioxide.

10. A nuclear fuel element of claim 1 in which the nuclear fuel material is a mixture comprising uranium dioxide and plutonium dioxide.

11. A nuclear fuel element of claim 1 in which the metal liner is selected from the group consisting of zirconium, zirconium alloys, niobium and niobium alloys.

12. A nuclear fuel element of claim 1 in which the metal liner is zirconium.

13. A nuclear fuel element of claim 1 in which the metal liner is a zirconium alloy.

14. A nuclear fuel element of claim 1 in which the metal liner is niobium.

15. A nuclear fuel element of claim 1 in which the metal liner is a niobium alloy.

16. A nuclear fuel element of claim 1 in which the container is selected from the group consisting of zirconium and zirconium alloys.

17. A method for producing a nuclear fuel element comprising establishing a layer of a high lubricity material in a metallic elongated container having the form of a right circular cylinder open at one end so that the layer is adjacent to the inner surface of said container, inserting a low neutron capture cross section metal liner into said container so that said liner is adjacent to said layer, partly filling said container with nuclear fuel material so that said fuel material is adjacent to and surrounded by said metal liner and sealing said open end of said container with an end plug.

18. A method according to claim 17 in which said layer of high lubricity material is a coating on said inner surface of said container.

19. A method according to claim 17 in which the layer of high lubricity material is a coating on the outer surface of the metal liner.

20. A method according to claim 17 in which said layer of high lubricity material is a hollow cylinder disposed between said liner and said container.

21. A method according to claim 17 in which the layer of high lubricity material is selected from the group consisting of graphite and molybdenum disulfide.

22. A method according to claim 21 in which the layer of high lubricity material is graphite.

23. A method according to claim 21 in which the layer of high lubricity material is molybdenum disulfide.

24. A method according to claim 17 in which the nuclear fuel material is selected from the group consisting of uranium compounds, plutonium compounds and mixtures thereof.

25. A method according to claim 17 in which the nuclear fuel material is comprised of uranium dioxide.

26. A method according to claim 17 in which the nuclear fuel material is a mixture comprised of uranium dioxide and plutonium dioxide.

27. A method according to claim 17 in which the metal liner is selected from the group consisting of zirconium, zirconium alloys, niobium and niobium alloys.

28. A method according to claim 17 in which the metal liner is zirconium.

29. A method according to claim 17 in which the metal liner is a zirconium alloy.

30. A method according to claim 17 in which the metal liner is niobium.

31. A method according to claim 17 in which the metal liner is a niobium alloy.

32. A method according to claim 17 in which said container is selected from the group consisting of zirconium and zirconium alloys.

* * * * *